UNITED STATES PATENT OFFICE.

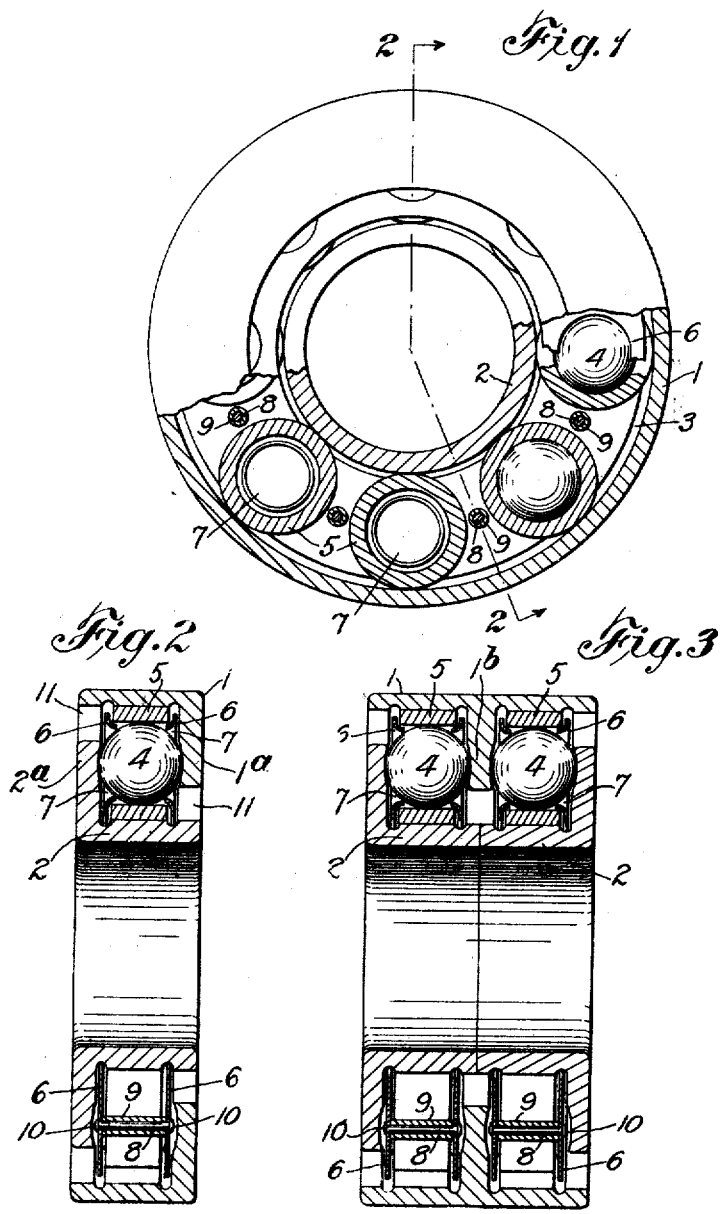

WILLIAM J. P. MOORE, OF NEW YORK, N. Y.

BALL-BEARING.

1,202,876.

Specification of Letters Patent.

Patented Oct. 31, 1916.

Application filed January 21, 1916. Serial No. 73,326.

*To all whom it may concern:*

Be it known that I, WILLIAM J. P. MOORE, a citizen of the United States, residing at New York, in the county of New York and State of New York, have invented certain new and useful Improvements in Ball-Bearings, of which the following is a specification, reference being had therein to the accompanying drawing.

My invention relates to a combined ball and roller bearing adapted for use in and with a great variety of machines.

One of the objects of the invention is to combine in a single bearing device all the advantages possessed separately by rollers and balls so that in a thrust bearing the thrust may be taken effectively and equally in all directions.

The invention, therefore, consists essentially in a hollow roller or sleeve containing within the same a spherical ball, all in combination with a suitable casing so that the ball may be free to rotate within the rolling sleeve and the sleeve may be free to revolve in the casing; and also the invention includes various details in the construction and application of the cages and the casings and other parts for supporting the balls and rollers; and furthermore, it embraces numerous details and peculiarities in the construction and arrangement of the various parts, substantially as will be hereinafter described and then more fully pointed out in the claims.

In the accompanying drawing illustrating my invention: Figure 1 is a transverse section of a ball and roller bearing constructed in accordance with my present improvements, the same being partly in side view. Fig. 2 is a cross-section of the same on the line 2, 2 of Fig. 1. Fig. 3 is a similar cross-section of twin or duplicate bearings in one casing.

Similar characters of reference designate corresponding parts throughout the different figures of the drawing.

In the explanation of my present invention, I have shown the same applied in a casing consisting of an outer revolving ring or cylinder 1 and an inner stationary ring or cylinder 2, such for example as may be found in connection with the hub and axle of a vehicle like an automobile, or, obviously, the parts may be reversed and the outer casing 1 may be stationary and the inner casing 2 may revolve, there being between these two cylindrical casings or rings an annular space 3 which contains a series of combined balls and rollers. Each of these combined devices consists of a spherical ball 4 and a hollow roller or sleeve 5, the ball 4 lying neatly and loosely within the roller 5 touching the same lightly at two points only or practically floating therein so that it can revolve freely, while the roller 5 which incloses the ball 4 lies similarly with a loose revolving touch between the outer cylinder and the inner cylinder 2. There is a series of these balls and rollers in the annular space 3 consisting of as many members as desired. Within the annular space 3 are also two cages 6 consisting of annular strips of metal provided at intervals with circular openings 7, having curved inwardly-pressed edges through the inside of which openings 7 portions of the spherical surfaces of the balls 4 project into a position where said balls are closely contiguous and in revolving contact with the L-shaped side wall 1ª of the casing 1 and the similar opposite side wall 2ª of the inner cylindrical casing 2. It will be observed moreover that the outside of the curved edges of the openings 7 in the cages 6 form together rings between which the rollers 5 revolve in close proximity to the rings, as is clearly shown in Fig. 2. These cages 6 are spaced apart and held in proper position by means of a series of rivets 8 surrounded by tubes 9, the tubes being located between the cages 6, while the rivets 8 pass through said members 6 and are headed at 10 at both ends. These rivets alternate between the combined ball and roller members, as shown in Fig. 1, and thus hold the parts in proper relation to each other. A lubricating medium may be introduced through the openings 11 at opposite sides of the bearing so as to lubricate the space between the balls, the rollers, and the cages so thoroughly that all the contacting surfaces will be effectually greased or oiled and will move upon each other with the greatest possible ease and without any wear and by virtue of the combination of the rollers with the balls both radial and lateral thrusts are provided for.

While in Fig. 2 I show a single series of the ball and roller members, in Fig. 3 I have duplicated the same so as to make a stronger and heavier bearing to perform a larger work than is possible with a single series of balls and rollers in that it is possible therewith to take lateral thrusts in both directions; but the construction and arrangement of all the various parts of the ball and roller members, the inner and outer cylindrical casings, and the cages, are substantially the same since the same results are attained, and, therefore, the practical accomplishment of the results is brought about through the same means with the same advantages increased and emphasized by the duplicate construction. In this case the outer rings 1 instead of being made L-shaped as before are made in one T-shaped piece with a single central inwardly projecting flange 1$^b$ in lieu of the flanges 1$^a$.

Many changes in the precise structure and arrangement of the various parts may be made without exceeding the scope of the invention, and I therefore reserve the liberty of making all such changes as experience may suggest to be wise and useful.

Having thus described my invention, what I claim as new and desire to secure by Letters Patent, is:—

1. In a ball and roller bearing, the combination of outer and inner rings having lateral annular flanges, a series of rollers in the space between the rings, balls within the rollers, cages between the balls and rollers and the flanges, said cages having openings loosely engaged by the rollers, and spacing means for holding the cages firmly together at points intermediate of the rollers.

2. In a bearing, the combination of outer and inner rings having lateral annular flanges, between which rings is an annular space, a series of rollers loosely placed in said space, a ball within each roller, and cages on the opposite sides of said balls and rollers and contiguous to the flanges, said cages having openings loosely engaged by the balls, which openings have curved flanges that engage the rollers.

3. In a ball bearing, the combination of inner and outer casings having oppositely-located flanges, a series of ball and roller members within the annular space between the casings, each comprising a hollow roller and a spherical ball within it, and cages on opposite sides of said members, the same being secured together at points intermediate of the members.

4. In a ball and roller bearing, the combination of a series of rollers having an opening therein, a loose spherical ball within each roller, and cages on the opposite sides of said balls and rollers, said cages having openings whose edges loosely engage the balls, and means for spacing the cages apart and holding them rigidly.

5. In a ball and roller bearing, the combination of an outer and inner ring between which is an annular space, a series of ball and roller members therein, each comprising a hollow roller and a spherical ball within it, cages on opposite sides of said members formed of annular strips provided at intervals with circular openings that loosely engage the balls, and means for holding the cages in a rigid position relatively to each other.

6. In a ball and roller bearing, the combination of inner and outer casings, a series of rollers in the space between them, balls within the rollers, and cages having circular openings loosely engaging the balls, said openings having curved edges.

7. In a ball and roller bearing, the combination of inner and outer casings, a series of rollers in the space between them, balls within the rollers, and cages having openings formed with curved edges which engage the balls.

8. In a ball and roller bearing, the combination of inner and outer rings, a series of rollers in the space between them, balls within the rollers, and cages having openings whose edges are curved, and engage on their outside surfaces the aforesaid rollers.

9. In a ball and roller bearing, the combination of inner and outer rings, a series of rollers in the space between them, balls within the rollers, and cages having openings whose edges loosely engage the rollers and balls.

In testimony whereof I affix my signature.

WILLIAM J. P. MOORE.